(12) United States Patent
Wehler et al.

(10) Patent No.: US 9,888,621 B2
(45) Date of Patent: Feb. 13, 2018

(54) BLADE ASSEMBLY FLANGE

(71) Applicant: BLOUNT, INC., Portland, OR (US)

(72) Inventors: Todd M. Wehler, Mt. Morris, IL (US); David Lienemann, Dixon, IL (US)

(73) Assignee: Blount, Inc., Portland, OR (US)

( * ) Notice: Subject to any disclaimer, the term of this patent is extended or adjusted under 35 U.S.C. 154(b) by 0 days.

(21) Appl. No.: 15/381,028

(22) Filed: Dec. 15, 2016

(65) Prior Publication Data

US 2017/0172046 A1    Jun. 22, 2017

Related U.S. Application Data

(60) Provisional application No. 62/268,446, filed on Dec. 16, 2015.

(51) Int. Cl.
| | | |
|---|---|---|
| A01B 35/28 | (2006.01) | |
| A01B 33/14 | (2006.01) | |
| A01B 33/02 | (2006.01) | |
| A01B 33/12 | (2006.01) | |

(52) U.S. Cl.
CPC .......... *A01B 33/142* (2013.01); *A01B 33/021* (2013.01); *A01B 33/12* (2013.01)

(58) Field of Classification Search
CPC ......... A01B 33/02; A01B 33/12; A01B 33/14; A01B 33/142; A01B 33/16; A01B 35/28
USPC ................ 172/123, 548, 745, 540, 698, 762
See application file for complete search history.

(56) References Cited

U.S. PATENT DOCUMENTS

| | | | | |
|---|---|---|---|---|
| 2,028,365 A | * | 1/1936 | Wangelin | A01B 35/28 |
| | | | | 172/556 |
| 3,151,685 A | * | 10/1964 | Field | A01B 33/142 |
| | | | | 172/42 |
| 3,698,485 A | * | 10/1972 | Trimpe | A01B 33/021 |
| | | | | 172/112 |
| 4,326,592 A | * | 4/1982 | Stephenson | A01B 33/103 |
| | | | | 172/123 |
| 4,461,138 A | * | 7/1984 | Whitman | A01D 34/4166 |
| | | | | 30/347 |
| 4,629,007 A | * | 12/1986 | Pegoraro | A01B 33/142 |
| | | | | 172/548 |
| 9,144,196 B2 | * | 9/2015 | Francis | A01D 43/16 |
| 2016/0198620 A1 | * | 7/2016 | Depault | A01B 21/04 |
| | | | | 172/540 |

FOREIGN PATENT DOCUMENTS

| | | | |
|---|---|---|---|
| EP | 1 222 844 | * | 7/2002 |
| FR | 3 040 855 | * | 3/2017 |

* cited by examiner

*Primary Examiner* — Gary Hartmann
(74) *Attorney, Agent, or Firm* — Schwabe Williamson & Wyatt, P.C.

(57) ABSTRACT

A flange for securing a rotary blade to a shaft that includes a solid plate with: an axially oriented shaft hole substantially in the center of the plate; two or more additional blade holes for securing a blade to the flange; an embossment around the shaft hole, providing a profile for stopping blade rotation about the blade hole; and a depression on the back face of the plate opposite the embossment, which provides a welding surface to secure the plate to a shaft passing through the shaft hole. Also are assemblages that include a flange, such as a blade assembly system for attaching two or more blades to a shaft, a bladed shaft, an attachable farm implement including a bladed shaft, and a powered machine, which includes a bladed shaft.

22 Claims, 5 Drawing Sheets

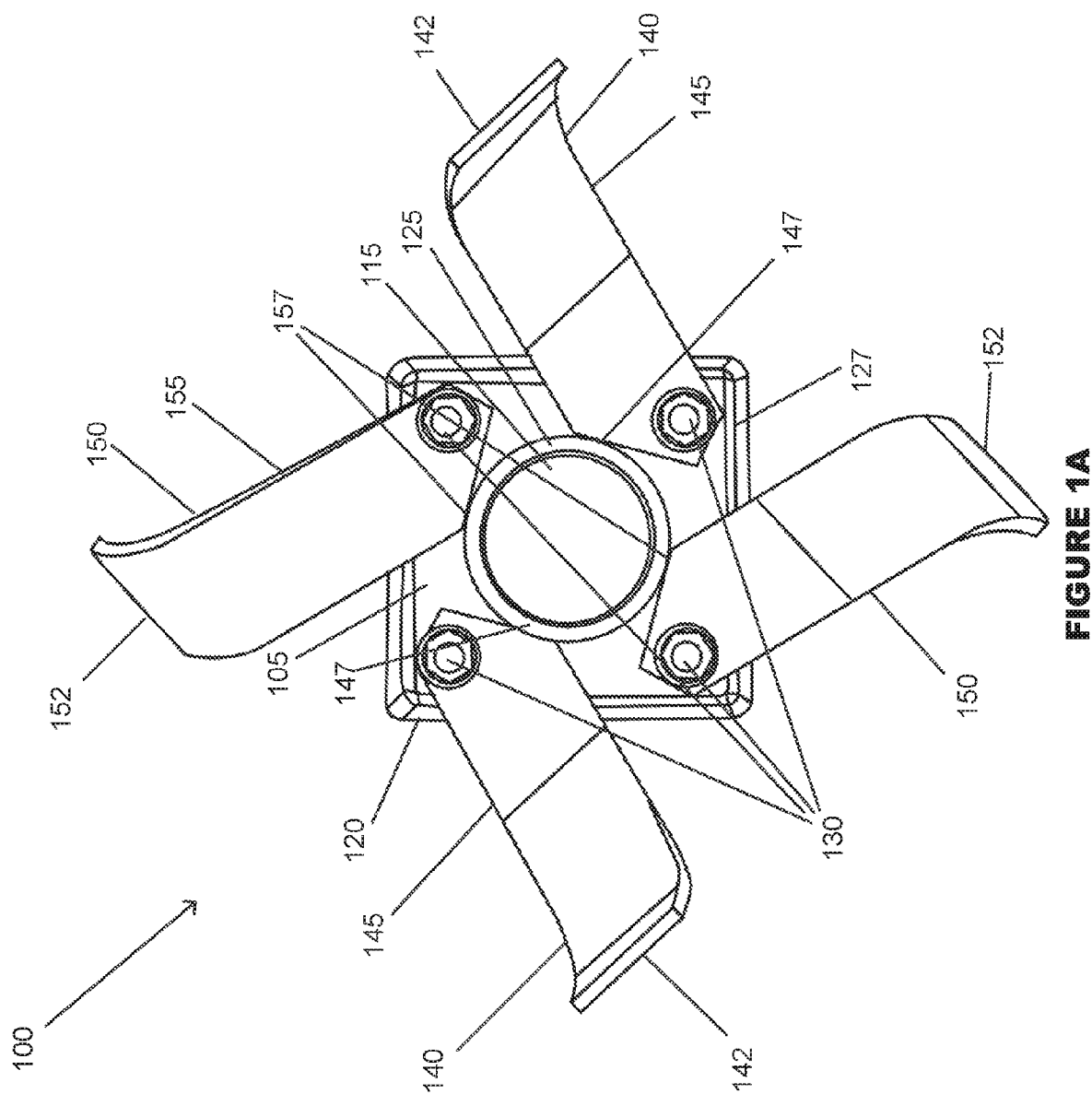

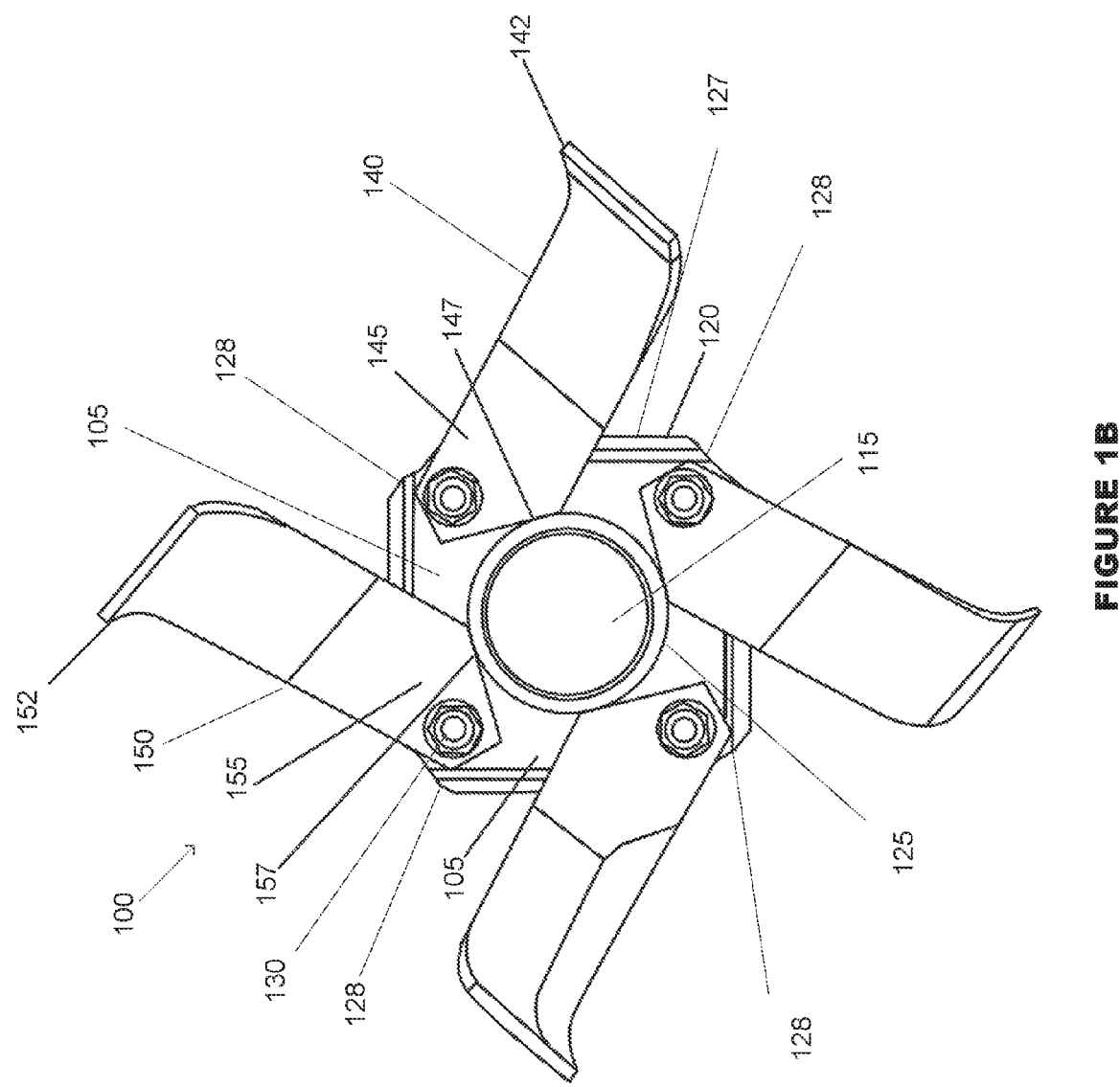

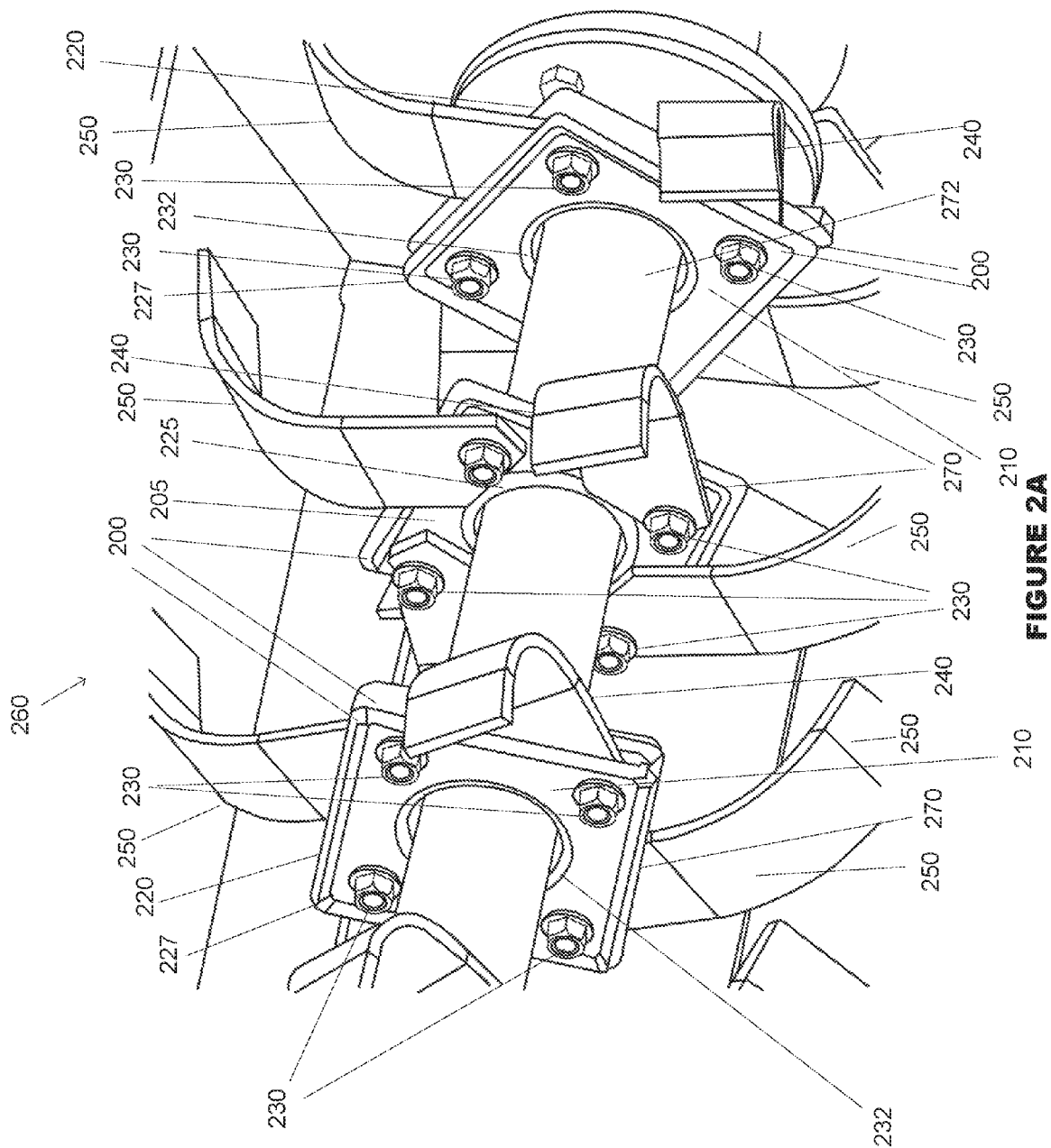

BLADE ASSEMBLY FLANGE

CROSS-REFERENCE TO RELATED APPLICATION

This application claims the priority benefit of the earlier filing date of U.S. Provisional Patent Application No. 62/268,446, filed Dec. 16, 2015, which is specifically incorporated herein by reference it its entirety.

TECHNICAL FIELD

Embodiments herein relate to the field of agricultural implements, and, more specifically, to a flange and system for retaining a blade to a rotating shaft.

BACKGROUND

Powered equipment, such as powered rotary tillers, have become an integrated part of any large or small scale farming operation, from industrial sized farms to the garden hobbyist. With respect to rotary tillers, the earth is typically worked to aerate the soil with blades affixed to a rotating shaft. Attaching these blades to the rotating shaft in an efficient and cost effective manner would provide a substantial benefit in the form of reduced production costs that could be passed on to the customer.

BRIEF DESCRIPTION OF THE DRAWINGS

Embodiments will be readily understood by the following detailed description in conjunction with the accompanying drawings and the appended claims. Embodiments are illustrated by way of example and not by way of limitation in the figures of the accompanying drawings.

FIG. 1A shows a view of the front face of a flange in accordance with embodiments herein.

FIG. 1B shows a view of the front face of a flange in accordance with embodiments herein.

FIG. 2A shows a perspective view of several blade assembly systems attached to a shaft in accordance with embodiments herein.

DETAILED DESCRIPTION OF DISCLOSED EMBODIMENTS

Figure 2B:
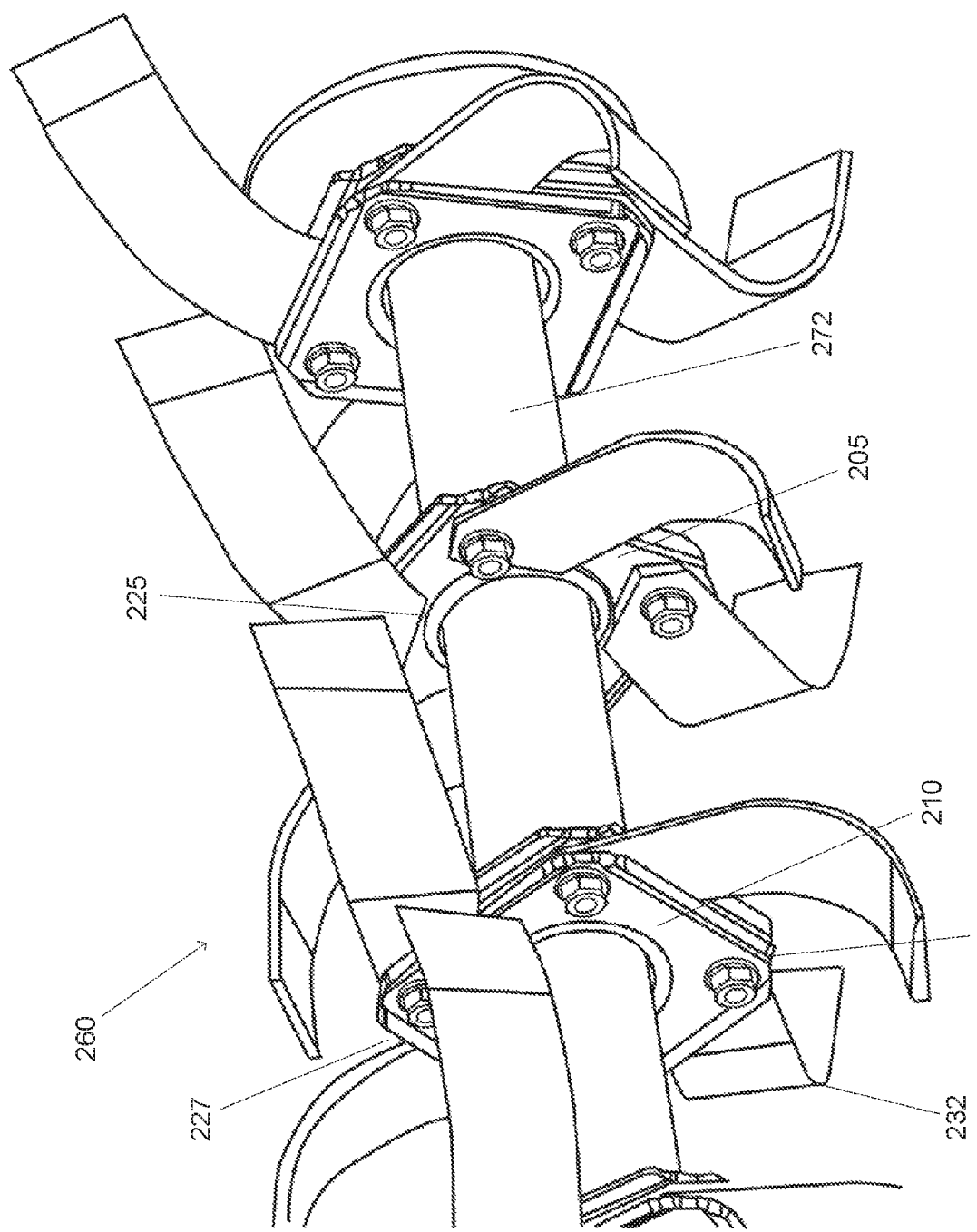
FIG. 2B shows a perspective view of several blade assembly systems attached to a shaft in accordance with embodiments herein.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical contact with each other. "Coupled" may mean that two or more elements are in direct physical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous, and are generally intended as "open" terms (e.g., the term "including" should be interpreted as "including but not limited to," the term "having" should be interpreted as "having at least," the term "includes" should be interpreted as "includes but is not limited to," etc.).

With respect to the use of any plural and/or singular terms herein, those having skill in the art can translate from the plural to the singular and/or from the singular to the plural as is appropriate to the context and/or application. The various singular/plural permutations may be expressly set forth herein for sake of clarity.

In various embodiments, a flange for securing a rotary blade to a shaft, a blade assembly system for attaching two or more blades to a shaft, a bladed shaft, an attachable farm implement including a bladed shaft, and a powered machine comprising a bladed shaft are provided.

In various embodiments, a flange for securing a rotary blade to a shaft includes a solid plate having a front face, an opposing back face, and one or more side edges between the front face and the back face. The number of side edges is dependent on the shape of the plate. In embodiments, the flange includes, disposed at its center, or substantially at its center, an axially oriented shaft hole extending from the back face of the plate through to the front face of the plate. The intended purpose of this hole is for passing a shaft through, such that the shaft is a fairly tight fit in the hole and can be coupled to the flange, for example by welding of the flange to the shaft at a specified position on the length of the shaft. In embodiments, the flange further includes at least two or more additional holes (blade attachment holes) for attaching two or more blades to the flange at a ratio of one blade per hole, for example with a fastener having a shaft, such as a bolt or a rivet. Typically such holes are arranged so that when two or more blades are attached at the blade attachment holes, for example with a fastener (such as a bolt, rivet, and the like), the resultant assembly of flange(s) and blades are substantially balanced when the flange is rotated about the long axis of a shaft passing through the centrally located shaft hole.

In embodiments, the flange includes an embossment around the shaft hole that extends outward from the front face of the plate. The inclusion of this structure on the front face of the plate provides a unique profile that acts as a stop for a blade attached to the flange at one of the blade holes, preventing blade rotation about the blade hole when the blade is attached. The movement of the blade about an axis of rotation about the blade attachment hole is thus inhibited. By way of example, the movement of the blade about a shaft of a fastener, such as the shaft of a bolt or rivet passing through the blade hole in the flange and a similar hole in the attached blade, is inhibited.

In embodiments, the flange includes an embossment or nub that extends outward from the front face of the plate. The inclusion of this structure on the front face of the plate keeps the two faces of opposing plates from touching and thereby leaves a gap for one or more blades to slide into. In an arrangement, either the shaft or an embossment around the central hole acts as a stop for a blade attached to the flange at one of the blade holes, preventing blade rotation about the blade hole when the blade is attached. By way of example, the movement of the blade about a shaft of a fastener, such as the shaft of a bolt or rivet passing through the blade hole in the flange and a similar hole in the attached blade, is inhibited.

In certain embodiments, the flange further includes a lip extending from the edge of the back face of the plate. In some embodiments, the lip extends about 20% to 200% of the thickness of the plate, although greater or lesser extensions of the lip are envisioned, for example the lip can extend from the surface of the flange face about the same amount as the thickness of the plate, in this example the lip extension would be 100% the plate thickness. In some embodiments, the lip is the same thickness as the plate, and is formed, for example by rolling the edge of the plate over during the manufacturing process. The lip can extend along all or some edges of the flange. In embodiments, where the flange is a polygon, the lip can extend around one or more corners of the polygon. In other embodiments, the lip extends to the corner of the polygonal flange and the corner is rounded over. In some embodiments, the corners of a polygonal flange are rounded. In some embodiments, the corners of the polygonal flange are rounded or cut off. For example the corners of the flange can be cut or at a 45° angle or other angle.

In embodiments, the flange includes a depression on the back face of the plate opposite the embossment. This depression provides a welding surface to secure the flange to a shaft passing through the shaft hole. Thus the embossment advantageously fulfills two purposes: (a) to provide a means to inhibit rotation of a blade attached with a single bolt; and (b) to provide a welding channel around a shaft inserted through the central hole, such as a channel for robotic welding.

One of the benefits of the disclosed flange configuration with a central embossment is that it allows for the use of a single fastener per blade, which reduces certain manufacturing costs, for example resulting in the use of less hardware, shorter assembly times, shorter replacement times, fewer blade holes, reduced steel thickness inputs, and processes transferred from human operation to robotic operation, for example stamping and/or welding. In addition, the single bolt design reduces the shear load of the bolt by half relative to a design having 2 bolts, reducing the risk of bolt breakage and/or blade loosening. Another benefit of the disclosed flange design is that service time for blade replacement is reduced, with the replacement of a blade effected by removing only a single bolt instead of two bolts commonly used in current tiller designs. Inclusion of the lip also strengthens the flange against bending and can allow for lighter gauge material to be used for the same application.

In embodiments, two flanges are paired up together to form a blade assembly system for attaching two or more blades to a shaft. The front faces of the flanges face each other and provide two embossments (one from each flange) to stop the rotation of an attached blade. Using an embossment that is slightly greater, such as between about 0.1% and 100% of the thickness of a blade selected for attachment results in a space between the paired flanges just wide enough to slide a blade in, allowing for the flanges to be secured to the shaft prior to blade attachment. In some embodiments, the end of the blade contacts the embossment tangentially, for example with a straight or convex surface of the blade end. In other embodiments, the blade contacts the embossment with a concave surface, for example that generally follows the curvature of the embossment. Such an arrangement allows for greater surface contact than a single point, as with straight or convex blade ends. In other embodiments, the contact surface of the blade may represent a complex curve or other shape that substantially matches the contour of the embossment. Such an arrangement may mitigate the effects of lateral forces applied to the blade, for example if the blade were to hit a rock or other hard object.

Typically the flanges are made from metal, such as steel, and stamped or otherwise cut, to produce the final flange. The disclosed flanges can be of various thicknesses, although typically they would be from ⅛ of an inch to ½ inch in thickness, with about ¼ inch thickness preferred for certain tiller blade applications, such as described herein. In certain embodiments, the embossment is between about 20% and 100% the thickness of the plate as measured from the front face of the plate to the back face of the plate, although greater or lesser thicknesses could be used in certain applications. In certain embodiments, the embossment is at least 50% or greater than the thickness of the blade, such as between 50% and 75%, for example 50%, 55%, 60%, 65%, 70%, or 75% of the thickness of the blade, although greater or lesser thicknesses could be used in certain applications.

A disclosed flange can accommodate a variety of shapes, which are typically oriented around a central axis of rotation with a rotation balance point fixed on the center of rotation. In embodiments, the shape of the flange is a regular polygon, such as a regular polygon having between 3 and 8 sides, such as 3, 4, 5, 6, 7, or 8 sides, although greater numbers are envisioned. In certain embodiments, the flange has a circular or elliptical shape.

In embodiments, a flange includes holes disposed about the flange for the attachment of 2 to 8 blades, such as 2, 3, 4, 5, 6, 7, or 8 blades, although greater numbers are envisioned as possible. The individual blades have an attachment section and a working section. The attachment section includes a hole for securing the blade to the flange, for example with the shaft of a bolt or other fastener passing through the hole in the blade and through holes in the opposing flanges, thereby creating a sandwich with the two opposing flanges sandwiching the blade between them.

Disclosed is a blade assembly system for attaching two or more blades to a shaft. In embodiments, a blade assembly system includes two disclosed flanges where the front faces of the two flanges face each. In embodiments, a blade assembly system further includes a fastener passing between opposite blade holes, for securing the blade to the blade assembly system, where the blade has a single hole therein for the fastener to pass through. In embodiments, the blade assembly system includes two or more blades secured to the two flanges, where the blade's rotation about the fastener is stopped by the embossments present on the opposing flanges. In some embodiments, a blade assembly system is secured to a shaft (a bladed shaft), for example by welding at the depressions opposite the embossments on the flanges. A bladed shaft can include two or more blade assembly systems, such as 2 to 100, although the exact number and/or spacing on the shaft can be selected based on the application of the bladed shaft. In addition, the rotational offset can be selected based on the application. Bladed shafts can be used on attachable or non-detachable implements, such as farm implements, such as tillers, cultivators, flail mowers, or other machines designed for working the earth or cutting plant material. In embodiments, an attachable implement is a machine that reversibly couples to a vehicle, for example a tiller. Also disclosed are powered machines that include a bladed shaft, such as tillers for home garden use or for use on a larger scale, for example with a compact tractor.

FIG. 1A shows an exemplary flange 100 for securing a rotary blade to a shaft according to embodiments herein. Flange 100 includes a front face 105, a back face (not visible in this view, but an example of which is shown as 210 in FIGS. 2A and 2B) with a central shaft hole 115, for passing a shaft (not shown) through and side edges 120. Flange 100 includes an embossment 125 around shaft hole 115. In the embodiment shown, flange 100 includes a lip 127 extending outward from edge 120 in the direction of the back face. Fasteners 130 (in this case a bolt and nut) are shown extending through flange 100 and passing through a blade hole (not shown) for securing blades 140, 150 (through a hole in the blade, also not shown). Blades 140, 150 include working sections 142, 152 and attachment sections 145, 155. In this embodiment, working sections 142 and 152 are shown as bent in an alternating in and out configuration used for tilling the ground. Blade attachment sections 145, 155 include stops 147, 157 which butt up against embossment 125 when in use. In the embodiment shown, this occurs when flange 100 and blades 140, 150 are rotating clockwise about the axis of a shaft passing through shaft hole 115. While this view shows blade stops 147, 157 tangentially contacting embossment 125, it is envisioned that a variety of blade profiles could be used to contact embossment 125. For example, in some embodiments the end of the blade contacts the embossment tangentially, for example with a straight or convex surface of the blade end. In other embodiments, the blade contacts the embossment with a concave surface, for example that generally follows the curvature of the embossment.

FIG. 1B shows an exemplary flange 100 for securing a rotary blade to a shaft according to embodiments herein. Flange 100 includes a front face 105 a back face with a central shaft hole 115, for passing a shaft (not shown) through and edges 120. Flange 100 includes an embossment 125 around shaft hole 115. In the embodiment shown, flange 100 includes a lip 127 extending outward from edge 120 in the direction of the back face. In the embodiment shown, corners 128 are cut off, for example at a 45° angle. Flange 100 includes a lip 127 extending outward from edge 120 in the direction of the back face. Fasteners 130 (in this case a bolt and nut) are shown extending through flange 100 and passing through a blade hole (not shown) for securing blades 140, 150 (through a hole in the blade, also not shown). Blades 140, 150 include working sections 142, 152 and attachment sections 145, 155. In this embodiment, working sections 142 and 152 are shown as bent in an alternating in and out configuration used for tilling the ground. Blade attachment sections 145, 155 include stops 147, 157 which butt up against embossment 125 when in use. In the embodiment shown, this occurs when flange 100 and blades 140, 150 are rotating counter clockwise about the axis of a shaft passing through shaft hole 115. While this view shows blade stops 147, 157 tangentially contacting embossment 125, it is envisioned that a variety of blade profiles could be used to contact embossment 125. For example, in some embodiments the end of the blade contacts the embossment tangentially, for example with a straight or convex surface of the blade end. In other embodiments, the blade contacts the embossment with a concave surface, for example that generally follows the curvature of the embossment.

FIGS. 2A and 2B show a bladed shaft 260 having three exemplary blade attachment systems 270 secured to a shaft 272 according to embodiments herein. As shown, central blade attachment system 270 has one flange 200 removed for clarity showing front face 205. Back face 210 can be seen on the left and right blade attachment systems 270, as well as the channel 232 formed opposite embossment 225. Lip 227 of edge 220 can also be seen in this view extending away from back face 210. This view further shows fasteners 230 securing blades 240, 250 to flanges 200. As shown in FIGS. 2A and 2B, flanges 200 are paired together with the front faces 205 opposing each other. The pairing of flanges 200 with two opposing embossments 225 provides a surface for the blade ends to rest against. In addition, the opposing flanges 200 provide a channel 232 for securing each flange 200 to shaft 272. As can further be seen from FIG. 2, the inclusion of embossment 225 on opposing flanges 200 provides a space, or gap, between the opposing flanges 200 wide enough for blade 250 to slide in. This gap provides for easy replacement of blade 250, for example should blade 250 become damaged.

Figure 3:
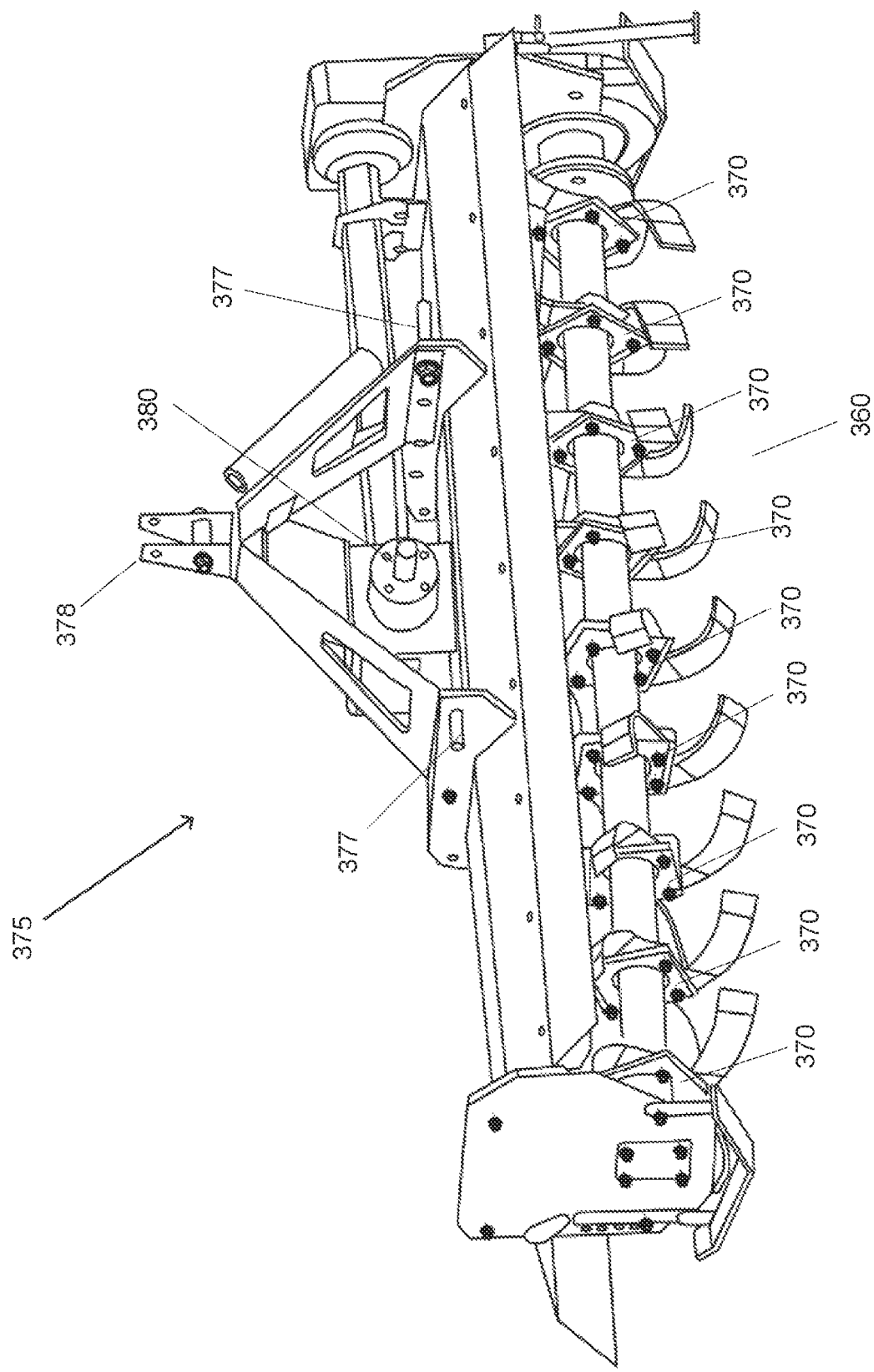
FIG. 3 shows a perspective view of a tiller attachment in accordance with embodiments herein.

FIG. 3 shows a powered tiller attachment 375 with an exemplary bladed shaft 360, upon which several blade attachment systems 370 are affixed according to embodiments herein. In the embodiment shown, powered tiller 375 couples to a vehicle through attachment points 377, 378. Bladed shaft 360 is driven through coupling of power feed 380 to a suitable vehicle having a power take off shaft, such as a tractor.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

The invention claimed is:

1. A flange for securing a rotary blade to a shaft, comprising:
   a plate, comprising:
      a front face,
      a back face, and
      one or more edges between the front face and back face, wherein the plate includes an axially oriented shaft hole substantially in the center of the plate extending from the back face to the front face of the plate;

two or more blade holes extending from the back face to the front face of the plate, each for securing a blade to the plate;

an embossment around the shaft hole extending from the front face of the plate, providing a profile for stopping blade rotation with respect to the plate;

a depression on the back face of the plate opposite the embossment, which provides a welding surface to secure the plate to a shaft passing through the shaft hole.

2. The flange of claim 1, wherein the embossment extends from the surface of the plate an amount that is between 20% and 100% of the thickness of the plate.

3. The flange of claim 1, wherein the embossment is at least 60% of the thickness of the blade.

4. The flange of claim 1, further comprising a lip extending from the edge of the back face of the plate.

5. The flange of claim 1, wherein the lip is formed from a rolled over section of the plate.

6. The flange of claim 1, wherein the flange includes from 3 to 8 blade holes.

7. The flange of claim 1, wherein the flange is a regular polygon.

8. The flange of claim 1, wherein the flange is substantially circular.

9. A blade assembly system for attaching two or more blades to a shaft, comprising:

two of the flanges of claim 1, wherein the front faces of the two flanges face each other.

10. The blade assembly system of claim 9, further comprising a fastener passing between two opposing blade holes on the two flanges, for securing a blade to the blade assembly system, and wherein the blade has a single hole therein for the fastener to pass through.

11. The blade assembly system of claim 10, further comprising two or more blades secured to the blade assembly system.

12. The blade assembly system of claim 11, wherein the blade's rotation about the fastener is stopped by the embossment.

13. The blade assembly system of claim 11, wherein the fastener clamps the blade between the two flanges preventing of rotation of the blade in combination with the embossment.

14. The blade assembly system of claim 10, wherein the system is secured to a shaft.

15. The blade assembly system of claim 10, wherein the system is secured by a weld.

16. A bladed shaft comprising two or more blade assembly systems of claim 10.

17. An attachable farm implement comprising the bladed shaft of claim 16.

18. The attachable farm implement of claim 17, wherein the attachable farm implement reversibly couples to a vehicle.

19. The attachable farm implement of claim 18, wherein the attachable farm implement is a tiller.

20. A powered machine comprising the bladed shaft of claim 16.

21. The powered machine of claim 20, wherein the machine is a tiller.

22. The powered machine of claim 20, wherein the tiller is a forward and/or and reverse rotating tiller.

* * * * *